United States Patent
Choi et al.

(10) Patent No.: US 7,992,893 B2
(45) Date of Patent: Aug. 9, 2011

(54) ASYMMETRICALLY EXPANDING AIRBAG CUSHION FOR VEHICLE

(75) Inventors: Hyeong Ho Choi, Gwangmyeong-si (KR); Chang Hyun Lee, Yongin-si (KR); Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 42 days.

(21) Appl. No.: 12/510,903

(22) Filed: Jul. 28, 2009

(65) Prior Publication Data
US 2010/0133791 A1    Jun. 3, 2010

(30) Foreign Application Priority Data
Dec. 3, 2008 (KR) .................. 10-2008-0121835

(51) Int. Cl.
*B60R 21/203* (2006.01)
*B60R 21/2334* (2011.01)
*B60R 21/2342* (2011.01)

(52) U.S. Cl. .............. 280/729; 280/731; 280/743.1; 280/743.2

(58) Field of Classification Search .......... 280/731, 280/742, 743.1, 729, 743.2
See application file for complete search history.

(56) References Cited

U.S. PATENT DOCUMENTS

| | | | | |
|---|---|---|---|---|
| 5,094,477 A * | 3/1992 | Togawa | ............ | 280/728.2 |
| 5,280,954 A * | 1/1994 | Henseler et al. | ............ | 280/743.1 |
| 5,378,019 A * | 1/1995 | Smith et al. | ............ | 280/743.1 |
| 5,421,610 A * | 6/1995 | Kavanaugh et al. | ............ | 280/743.1 |
| 5,833,265 A * | 11/1998 | Seymour | ............ | 280/743.1 |
| 5,899,495 A * | 5/1999 | Yamamoto et al. | ............ | 280/743.1 |
| 6,142,507 A * | 11/2000 | Okuda et al. | ............ | 280/730.2 |
| 6,209,912 B1 * | 4/2001 | Staub et al. | ............ | 280/743.1 |
| 6,626,459 B2 * | 9/2003 | Takimoto et al. | ............ | 280/731 |
| 6,634,670 B1 * | 10/2003 | Ellerbrok et al. | ............ | 280/743.1 |
| 7,198,290 B2 * | 4/2007 | Yamada et al. | ............ | 280/731 |
| 7,648,166 B2 * | 1/2010 | Maripudi | ............ | 280/740 |
| 2008/0030008 A1 * | 2/2008 | Zofchak et al. | ............ | 280/728.2 |

FOREIGN PATENT DOCUMENTS

JP          07215149 A  *  8/1995

(Continued)

OTHER PUBLICATIONS

Yuki et al., Airbag, Oct. 7, 1997, JPO, JP 09-263202 A, English Abstract.*

(Continued)

*Primary Examiner* — Paul N Dickson
*Assistant Examiner* — James English
(74) *Attorney, Agent, or Firm* — Morgan, Lewis & Bockius LLP (57) ABSTRACT

Disclosed herein is an asymmetrically expanding airbag cushion for a vehicle, which is inflated when airbag gas flows from an inflator through a gas hole to an interior of a cushion bag as a result of a vehicle collision. The airbag cushion includes a central expansion portion, a lower expansion portion and an upper expansion portion. The central expansion portion is provided on the central portion of the cushion bag to communicate with the gas hole. The lower expansion portion is surrounded by a lower sewing line which is open at a lower portion, and positioned under the central expansion portion. The upper expansion portion is surrounded by an upper sewing line which is open at an upper portion, and positioned above the central expansion portion. The central, lower and upper expansion portions are sequentially inflated when the airbag gas flows into the cushion bag.

8 Claims, 6 Drawing Sheets

FOREIGN PATENT DOCUMENTS

| | | | | |
|---|---|---|---|---|
| JP | 08156730 | A | * | 6/1996 |
| JP | 08301037 | A | * | 11/1996 |
| JP | 09263202 | A | * | 10/1997 |
| JP | 2000-118341 | A | | 4/2000 |
| KR | 2003-0016896 | A | | 3/2003 |

OTHER PUBLICATIONS

Yuki et al., Airbag, Oct. 7, 1997, JPO, JP 09-263202 A, Machine Translation of Description.*

Sogi et al., Air Bag for Vehicle, Nov. 19, 1996, JPO, JP 08-301037 A, English Abstract.*

Sogi et al., Air Bag for Vehicle, Nov. 19, 1996, JPO, JP 08-301037 A, Machine Translation of Description.*

Ogami et al., Vehicular Air Bag, Aug. 15, 1995, JPO, JP 07-215149 A, English Abstract.*

Ogami et al., Vehicular Air Bag, Aug. 15, 1995, JPO, JP 07-215149 A, Machine Translation of Description.*

* cited by examiner

ASYMMETRICALLY EXPANDING AIRBAG CUSHION FOR VEHICLE

CROSS-REFERENCE TO RELATED APPLICATIONS

The present application claims priority to Korean Patent Application Number 10-2008-0121835 filed Dec. 3, 2008, the entire contents of which application is incorporated herein for all purpose by this reference.

BACKGROUND OF THE INVENTION

1. Field of the Invention

The present invention relates to an airbag cushion for a vehicle, which asymmetrically expands at different expansion speeds in a vertical direction.

2. Description of the Related Art

Generally, a vehicle is provided with an airbag device so as to safely protect a passenger from impact in the event of a collision.

Figure 5:
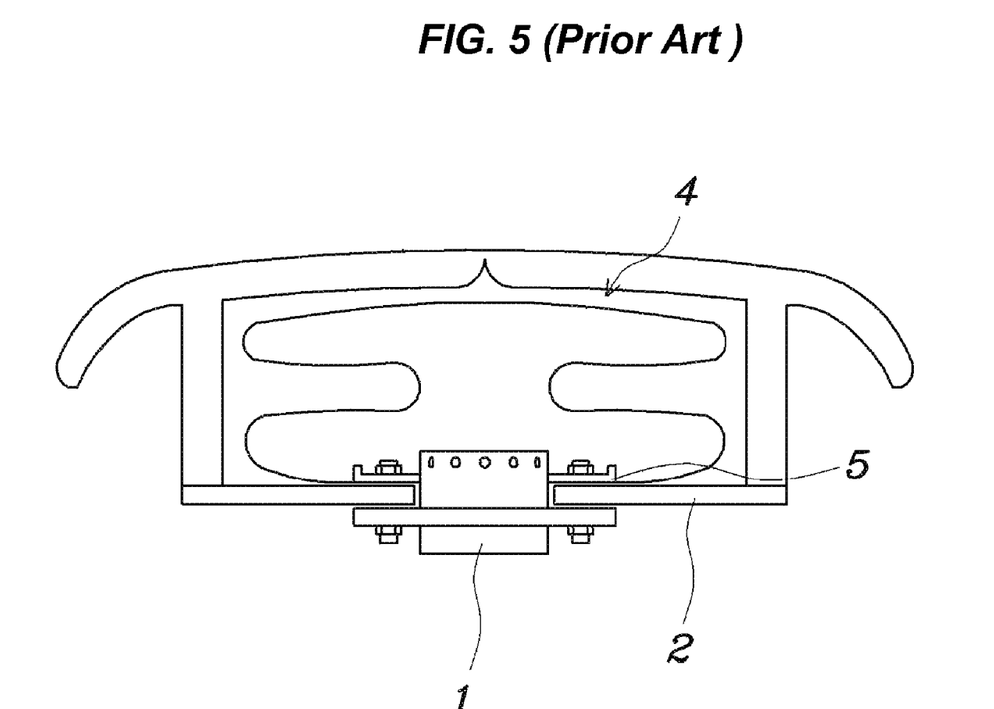
FIG. 5 is a view illustrating the construction of a conventional airbag device.

As shown in FIG. 5, a conventional airbag device includes an inflator 1, a cover bracket 2 and an airbag cushion 4. The inflator 1 discharges internal gas in response to a signal transmitted from an electronic control unit. The inflator 1 is mounted to the cover bracket 2. The airbag cushion 4 is folded to be accommodated in the cover bracket 2 and is inflated by the gas which is discharged from the inflator 1, with an injection port coupled to a coupling hole of the cover bracket 2 via a retainer ring 5.

That is, in the event of a vehicle collision, the electronic control unit detects the vehicle collision through a sensor. Thereafter, an operation signal is applied to the inflator 1. The inflator 1 injects airbag gas into the airbag cushion 4 to expand the airbag cushion 4.

However, in the case of a driver who drives a vehicle from a position near a steering wheel, the airbag cushion expands rapidly towards his or her chest, neck, or head which are adjacent to the airbag cushion in the event of a vehicle collision, so that the driver may be impacted by the expansionary force of the airbag cushion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an asymmetrically expanding airbag cushion for a vehicle, which is rapidly inflated to absorb impact energy, and simultaneously prevents impact shock due to the inflation of the airbag cushion.

In an aspect of the present invention, the asymmetrically expanding an airbag cushion for a vehicle, which is inflated when airbag gas flows from an inflator through a gas hole to an interior of a cushion bag as a result of a vehicle collision, may include a central expansion portion provided on a central portion of the cushion bag in such a way as to communicate with the gas hole, a lower expansion portion surrounded by a lower sewing line which is open at a lower portion thereof, and positioned under the central expansion portion, wherein the lower expansion portion is spaced form the gas hole in a predetermined distance therebetween in a vertical direction of the cushion bag, and an upper expansion portion surrounded by an upper sewing line which is open at an upper portion thereof, and positioned above the central expansion portion, wherein the upper expansion portion is spaced form the gas hole in a predetermined distance therebetween in the vertical direction of the cushion bag, wherein the central expansion portion, the lower expansion portion, and the upper expansion portion are sequentially inflated when the airbag gas flows into the cushion bag.

A cross-section of the lower expansion portion may be smaller than a cross-section of the upper expansion portion. The cushion bag may include a path formed between an outer portion of the upper sewing line and an upper edge of the cushion bag so that the airbag gas flows along the path. A vent hole may be formed in the upper expansion portion to discharge the airbag gas from the interior of the cushion bag. An inlet of the upper expansion portion may be formed to be smaller than an inlet of the lower expansion portion.

The lower sewing line may be sewn continuously or discontinuously on a lower portion of the cushion bag in such a way as to become unsewn when the lower expansion portion has fully expanded, wherein the lower sewing line includes a vertical sewing line which is provided on the lower portion of the cushion bag in such a way as to be sewn in a vertical direction of the cushion bag and the lower sewing line is formed in a "∩" shape.

The upper sewing line may be sewn continuously or discontinuously on an upper portion of the cushion bag in such a way as to become unsewn when the upper expansion portion has fully expanded, wherein the upper sewing line includes a horizontal sewing line which is provided on the upper portion of the cushion bag in such a way as to be sewn in a horizontal direction of the cushion bag.

In another aspect of the present invention, the asymmetrically expanding airbag cushion for a vehicle, which is inflated when airbag gas flows from an inflator through a gas hole to an interior of a cushion bag as a result of a vehicle collision, may include a central expansion portion provided on a central portion of the cushion bag below a horizontal sewing line which is sewn on an upper portion of the cushion bag in a horizontal direction of the cushion bag, wherein the gas hole is disposed below the horizontal sewing line in such a way as to communicate with the gas hole, and an upper expansion portion provided on an upper portion of the cushion bag in such a way as to be positioned above the horizontal sewing line, wherein the central expansion portion includes first and second central expansion portions which are provided on left and right sides of a vertical sewing line sewn on a lower portion of the cushion bag in a vertical direction of the cushion bag, wherein a vent hole is formed above the horizontal sewing line and wherein a vent hole is formed above the horizontal sewing line.

In further another aspect of the present invention, the asymmetrically expanding an airbag cushion for a vehicle, which is inflated when airbag gas flows from an inflator through a gas hole to an interior of a cushion bag as a result of a vehicle collision, may include a central expansion portion provided on a central portion of the cushion bag in such a way as to communicate with the gas hole, a lower expansion portion surrounded by a lower sewing line which is open at a lower portion thereof, and positioned under the central expansion portion, wherein the lower expansion portion is spaced form the gas hole in a predetermined distance therebetween in a vertical direction of the cushion bag, and an upper expansion portion enclosed by an upper sewing line and positioned above the central expansion portion, wherein the upper expansion portion is spaced form the gas hole in a predetermined distance therebetween in the vertical direction of the cushion bag, wherein the central expansion portion, the lower expansion portion, and the upper expansion portion are sequentially inflated when the airbag gas flows into the cushion bag.

The cushion bag may include a path formed between an outer portion of the upper sewing line and an upper edge of the cushion bag so that the airbag gas flows along the path. The lower sewing line may be sewn continuously or discontinuously on a lower portion of the cushion bag in such a way as to become unsewn when the lower expansion portion has fully expanded. The lower sewing line may include a vertical sewing line which is provided on the lower portion of the cushion bag in such a way as to be sewn in a vertical direction of the cushion bag and the lower sewing line is formed in a "⌒" shape.

The upper sewing line may be sewn continuously or discontinuously on an upper portion of the cushion bag in such a way as to become unsewn when the upper expansion portion has fully expanded, wherein the upper sewing line includes a horizontal sewing line which is provided on the upper portion of the cushion bag in such a way as to be sewn in a horizontal direction of the cushion bag.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contra the invention(s) is/are intended to cover not only the exemplary embodiments, but also various alternatives, exemplary embodiments, equivalents and other embodiments, which may be included within the spirit and scope of the invention as defined by the appended claims.

Figure 1:
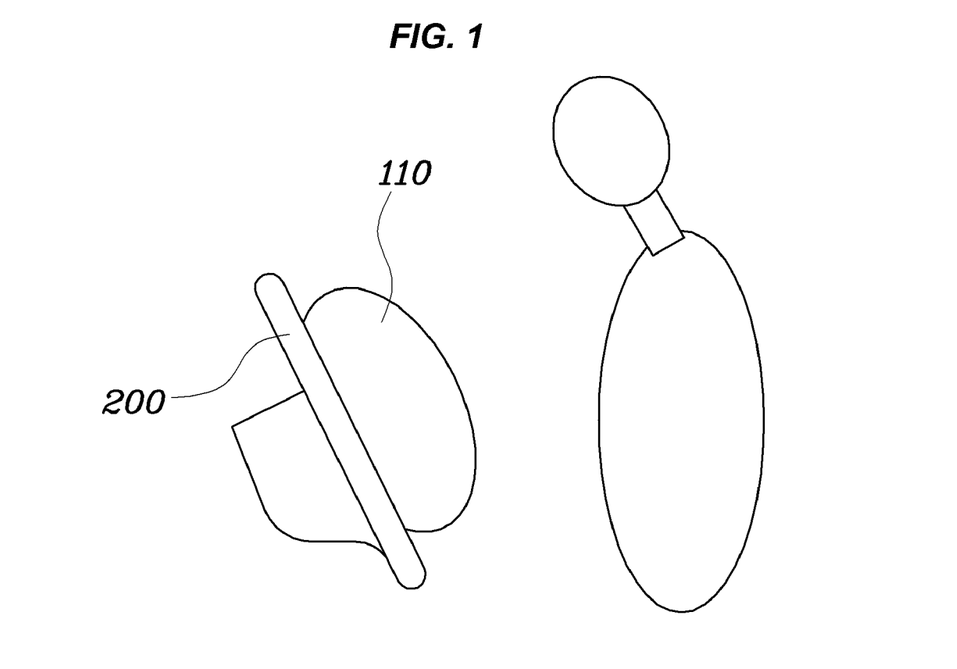
FIG. 1 is a conceptual view illustrating the state in which an exemplary airbag cushion for a vehicle according to the present invention is asymmetrically expanded.
Figure 2:
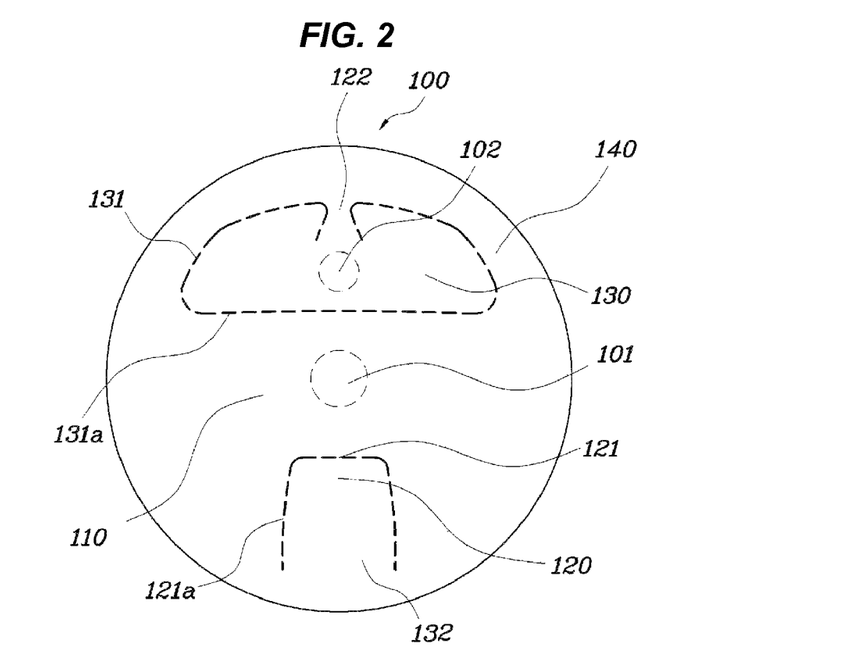
FIG. 2 is a view illustrating the construction of an exemplary airbag cushion for a vehicle according to the present invention.

As shown in FIG. 1 or 2, the airbag cushion according to various embodiments of the present invention is constructed so that the central expansion portion 110, the lower expansion portion 120 and the upper expansion portion 130 of a cushion bag 100 sequentially inflate in the event of a vehicle collision, thus absorbing impact energy acting on a passenger which is close to a steering wheel 200, and preventing impact shock due to the inflation of the cushion bag 100.

In detail, the cushion bag 100 includes the central expansion portion 110 communicating with a gas hole 101, the lower expansion portion 120 surrounded by a lower sewing line 121 which is open at a lower portion, and the upper expansion portion 130 surrounded by an upper sewing line 131 which is open at an upper portion.

The cushion bag 100 is folded to be mounted to the cover bracket of the steering wheel 200, and is inflated when high-pressure airbag gas is supplied from an inflator through the gas hole 101 to the cushion bag 100. Since the construction of the cushion bag 100, the cover bracket and the inflator mounted to the steering wheel 200 corresponds to the construction of the airbag cushion, the cover bracket and the inflator mounted to a conventional airbag device, the detailed description of the cushion bag 100, the cover bracket and the inflator will be omitted herein. However, unlike the conventional airbag device, the lower expansion portion 120 is provided on the cushion bag 100 through the lower sewing line 121 which is open at the lower portion, and the upper expansion portion 130 is provided on the cushion bag 100 through the upper sewing line 131 which is open at the upper portion.

The lower expansion portion 120 is provided under the central expansion portion 110 and has a predetermined space surrounded by the lower sewing line 121. The predetermined space is charged with airbag gas which is supplied from the central expansion portion 110 in the event of a vehicle collision.

Further, the lower sewing line 121 is sewn on the lower portion of the cushion bag 100 in a "⌒" shape. The lower sewing line 121 has vertical sewing lines 121a which are sewn in a vertical direction. By the vertical sewing lines 121a, an inlet 132 which is open at its lower portion is formed. The airbag gas of the central expansion portion 110 is supplied through the inlet 132.

In the event of a vehicle collision, the lower expansion portion 120 rapidly expands in a space between a portion under a passenger's chest (i.e. the abdomen) and the lower portion of the steering wheel 200, thus preventing the passenger from colliding with the steering wheel 200 and suffering impact shock.

Particularly, the lower sewing line 121 rips open when the lower expansion portion 120 inflates above a predetermined pressure, thus the lower expansion portion 120 is included in the central expansion portion 110. Thus, at the initial expansion step of the cushion bag 100, the lower expansion portion 120 is primarily inflated, thus protecting a portion under a passenger's chest from impact with the steering wheel 200. Afterwards, the lower sewing line 121 rips open, so that the lower expansion portion 120 secondarily inflates, thus absorbing the entire impact energy.

The upper expansion portion 130 is provided above the central expansion portion 110 and has a predetermined space which is surrounded by the upper sewing line 131. In the event of a vehicle collision, the airbag gas is supplied from the central expansion portion 110 to the predetermined space. Preferably, the predetermined space of the upper expansion portion 130 has a larger volume than that of the lower expansion portion 120.

Further, a path 140 is formed between the outer portion of the upper expansion portion 130 and the upper edge of the cushion bag 100, so that airbag gas flows along the path 140. The path 140 provides a narrow passage through which the airbag gas flows. Thus, the upper expansion portion 130 is charged with the airbag gas such that the charging speed of the upper expansion portion 130 is slower than that of the lower expansion portion 120.

Moreover, the upper sewing line 131 includes a horizontal sewing line 131a which is sewn in a horizontal direction on the upper portion of the cushion bag 100. The upper sewing line 131 curves upwards from each end portion of the horizontal sewing line 131a, thus forming an inlet 122 which is smaller than the inlet 132 of the lower sewing line 121. Thereby, the upper expansion portion 130 may be charged with the airbag gas such that the charging speed of the upper expansion portion 130 is slower than that of the lower expansion portion 120.

Particularly, the upper sewing line 131 rips open when the upper expansion portion 130 inflates to a predetermined pressure or more, thus the upper expansion portion 130 is included in the central expansion portion 110. Thus, in the initial expansion step of the cushion bag 100, the upper expansion portion 130 is primarily inflated, thus protecting a passenger's head from impact with the steering wheel 200. Subsequently, the upper sewing line 131 rips open, so that the upper expansion portion 130 secondarily inflates, thus absorbing the entire impact energy.

The upper expansion portion 130 is provided with a vent hole 102 which is used to discharge the airbag gas from the interior of the cushion bag 100. Since the vent hole 102 is located in the upper expansion portion 130, the loss of the internal pressure of the cushion bag 100 may occur in the initial expansion step.

Figure 3A:
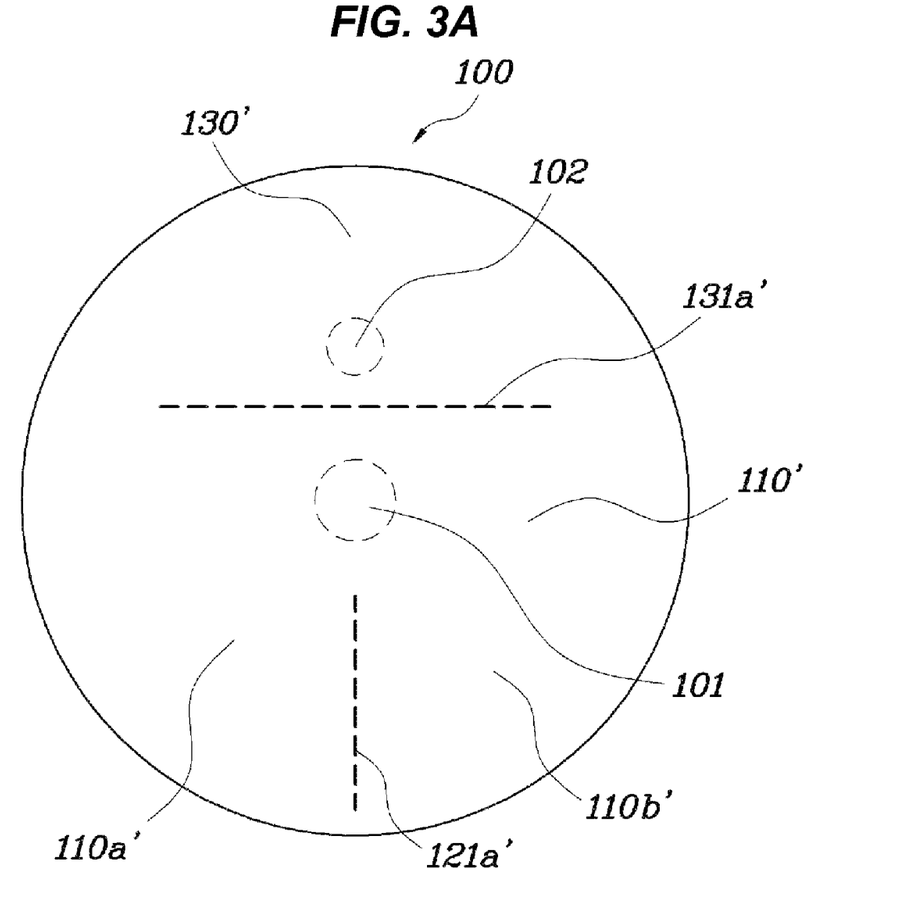
FIG. 3A is a view illustrating the construction of an exemplary airbag cushion for a vehicle according to the present invention.

As shown in FIG. 3A, an airbag cushion according to an exemplary of the present invention may include a central expansion portion 110' and an upper expansion portion 130'. The central expansion portion 110' is provided on the central portion of a cushion bag 100 in such a way as to communicate with a gas hole 101. The upper expansion portion 130 is provided on the upper portion of a cushion bag 100 in such a way as to be positioned above a horizontal sewing line 131a which is sewn in a horizontal direction.

In a detailed description, the horizontal sewing line 131a extends on the upper portion of the cushion bag 100 in such a way as to sew the cushion bag 100 in the horizontal direction. A vertical sewing line 121a extends on the lower portion of the cushion bag 100 in such a way as to sew the cushion bag 100 in the vertical direction. Thus, the cushion bag 100 is divided into the central expansion portion 110' and the upper expansion portion 130' by the horizontal sewing line 131a'. Further, the cushion bag 100 is divided into first and second central expansion portions 110a' and 110b' which are provided on the left and right sides of the vertical sewing line 121a'.

The horizontal sewing line 131a' connects the upper portion of the cushion bag 100 in the horizontal direction under a predetermined pressure or less of the airbag gas when the cushion bag 100 is inflated, thus suppressing the upward expansion of the cushion bag 100 for a predetermined period of time. Of course, when the pressure of the airbag gas exceeds a predetermined pressure, the horizontal sewing line 131a' is unsewn, and the cushion bag 100 can be smoothly expanded upwards.

The vertical sewing line 121a' connects the lower portion of the cushion bag 100 in the vertical direction when the cushion bag 100 is inflated, thus promoting the downward expansion of the cushion bag 100.

Figure 3B:
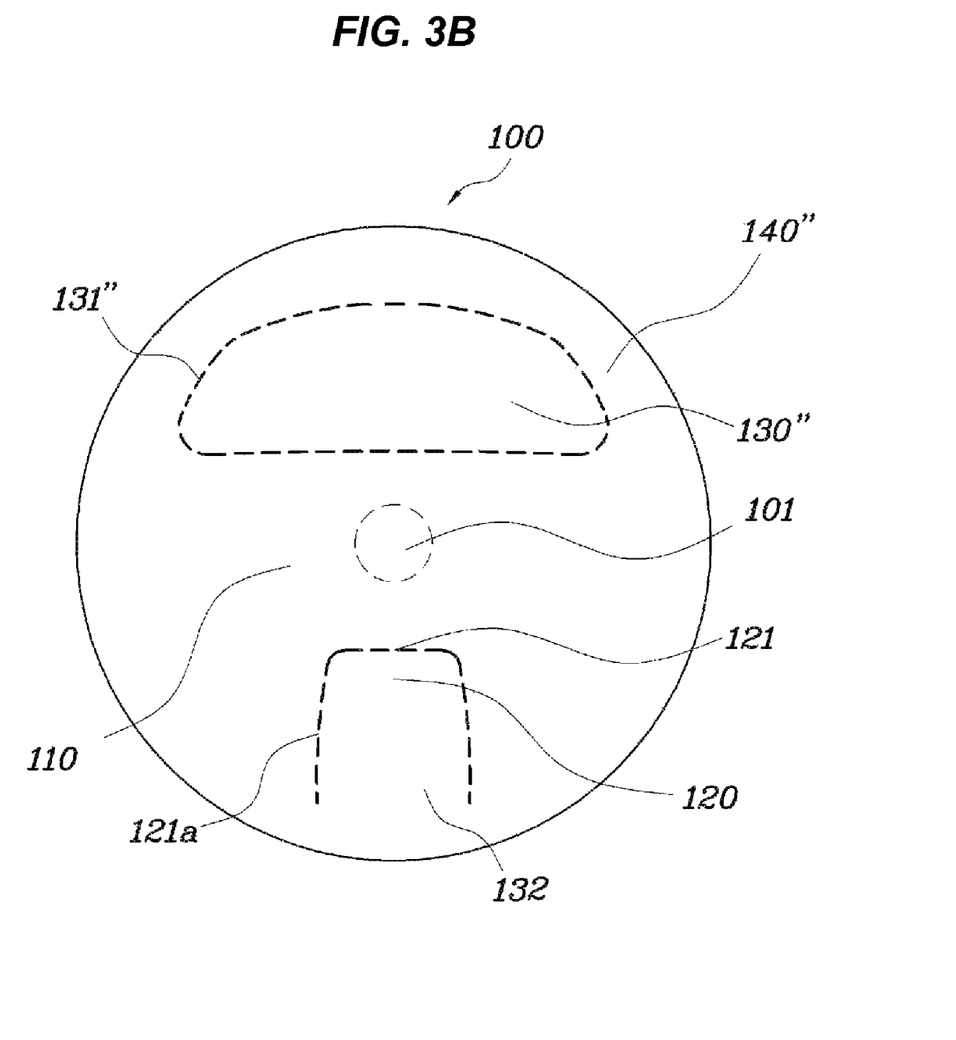
FIG. 3B is a view illustrating the construction of an exemplary airbag cushion for a vehicle according to the present invention.

As shown in FIG. 3B, an airbag cushion according to other embodiments of the present invention includes a central expansion portion 110 communicating with a gas hole 101, a lower expansion portion 120 surrounded by a lower sewing line 121 which is open at a lower portion, and an upper expansion portion 130" having an enclosed section.

Since the constructions of the central expansion portion 110 and the lower expansion portion 120 remain the same as those of the central expansion portion and the lower expansion portion applied to the airbag cushion of FIG. 2, the detailed description of the central expansion portion 110 and the lower expansion portion 120 will be omitted herein.

Meanwhile, the upper expansion portion 130" is located above the central expansion portion 110 and has the enclosed section which is surrounded by an upper sewing line 131". A path 140" is formed around the upper expansion portion 130" so that airbag gas flows along the path 140". The path 140" provides a narrow space to be filled with the airbag gas.

Thus, when the cushion bag 100 expands, the path 140" of the upper expansion portion 130" is filled with a small amount of airbag gas, so that the cushion bag 100 protects a passenger's head from impact shock with the steering wheel 200.

Hereinafter, the expansionary process of the cushion bag according to various embodiments of the present invention will be described in brief.

Figure 4A:
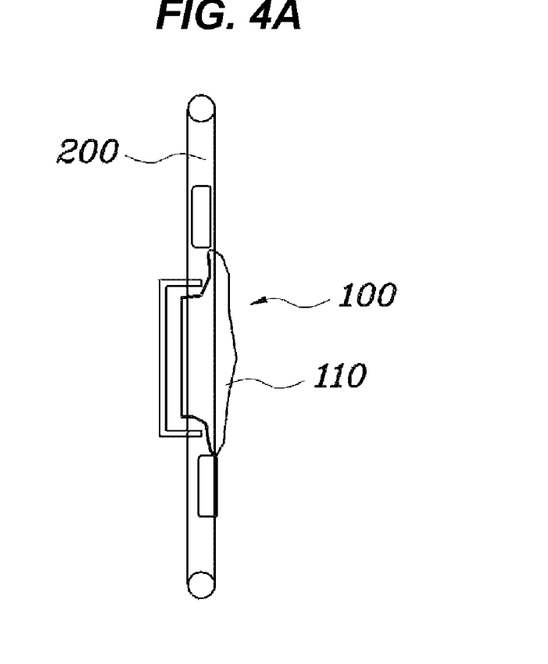
FIGS. 4A to 4D are views illustrating an exemplary expansionary process of the airbag cushion for a vehicle according to the present invention.

As shown in FIG. 4A, in the state where the cushion bag 100 is folded on the cover bracket of the steering wheel 200, when the cushion bag 100 starts to expand, first, the central expansion portion 110 of the cushion bag 100 starts to inflate.

Figure 4B:
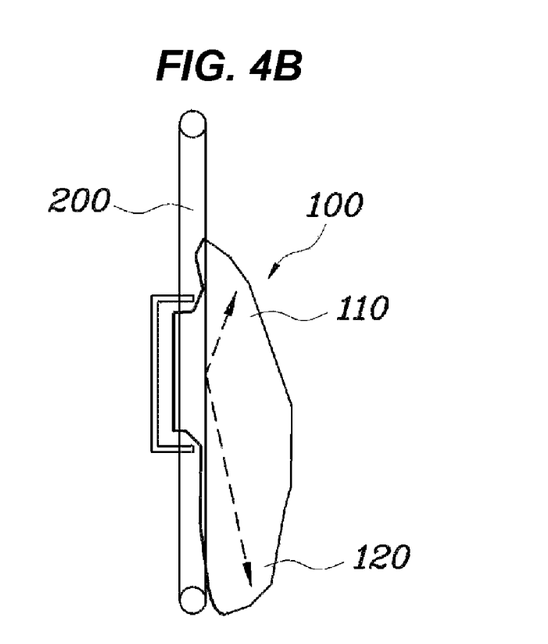

As shown in FIG. 4B, while the lower expansion portion 120 of the cushion bag 100 is inflated by the airbag gas supplied from the central expansion portion 110, the lower expansion portion 120 protects a portion under a passenger's chest from impact with the steering wheel 200. At this time, the expansion of the upper end of the cushion bag 100 is suppressed for a predetermined period of time while being hindered by the horizontal sewing line 131a.

Figure 4C:
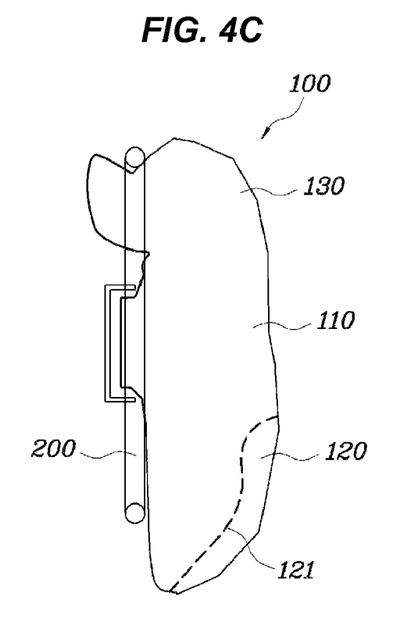

As shown in FIG. 4C, when the upper expansion portion 130 starts to inflate and the pressure of the airbag gas exceeds a predetermined pressure, the vertical sewing line 121 a becomes unsewn, and the lower expansion portion 120 expands fully.

Figure 4D:
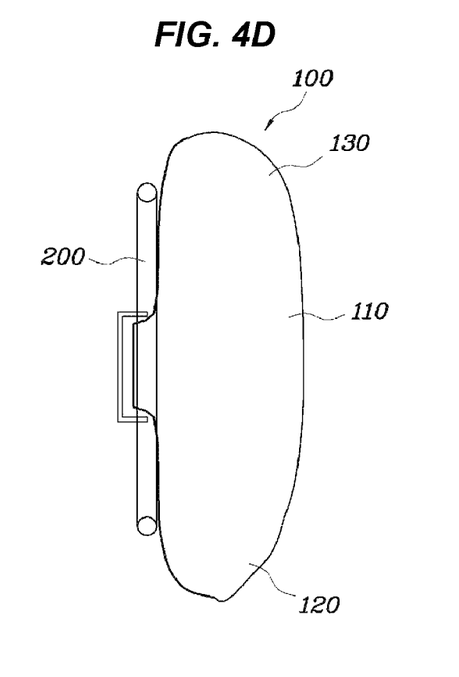

Thereafter, as shown in FIG. 4D, when the pressure of the airbag gas exceeds a predetermined pressure, the horizontal sewing line 131a becomes unsewn, and the upper expansion portion 130 also expands fully.

As such, the present invention is constructed so that the central expansion portion 110, the lower expansion portion 120 and the upper expansion portion 130 of the cushion bag 100 are sequentially inflated via the lower sewing line 121 including the vertical sewing lines 121 a and the upper sewing line 131 including the horizontal sewing line 131a which are provided on the cushion bag 100, in the event of a vehicle collision. Thus, the present invention absorbs impact energy between the steering wheel 200 and a passenger adjacent to the steering wheel 200 in the event of the vehicle collision, in addition to effectively preventing impact due to the momentary inflation of the cushion bag 100.

As described above, the present invention in various aspect, is advantageous in that the central portion, lower portion and upper portion of a cushion bag inflate in a rapid sequence, thus absorbing impact energy, and simultaneously preventing impact shock due to the momentary inflation of an airbag cushion.

For convenience in explanation and accurate definition in the appended claims, the terms "central", "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many exemplary embodiments and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and exemplary embodiments thereof. It is intended that the scope of the invention be defined by the Claims appended hereto and their equivalents.

What is claimed is:

1. An asymmetrically expanding an airbag cushion for a vehicle, which is inflated when airbag gas flows from an inflator through a gas hole to an interior of a cushion bag as a result of a vehicle collision, the airbag cushion comprising:
    a central expansion portion provided on a central portion of the cushion bag in such a way as to communicate with the gas hole:,
    a lower expansion portion surrounded by a lower sewing line which is open at a lower portion thereof, and positioned under the central expansion portion, wherein the lower expansion portion is spaced form the gas hole in a predetermined distance therebetween in a vertical direction of the cushion bag; and
    an upper expansion portion surrounded by an upper sewing line which is open at an upper portion thereof, and positioned above the central expansion portion, wherein the upper expansion portion is spaced form the gas hole in a predetermined distance therebetween in the vertical direction of the cushion bag;
    wherein the central expansion portion, the lower expansion portion, and the upper expansion portion are sequentially inflated when the airbag gas flows into the cushion bag; and
    wherein an inlet of the upper expansion portion is formed to be smaller than an inlet of the lower expansion portion.

2. The asymmetrically expanding airbag cushion as set forth in claim 1, wherein a cross-section of the lower expansion portion is smaller than a cross-section of the upper expansion portion.

3. The asymmetrically expanding airbag cushion as set forth in claim 1, wherein the cushion bag comprises a path formed between an outer portion of the upper sewing line and an upper edge of the cushion bag so that the airbag gas flows along the path.

4. The asymmetrically expanding airbag cushion as set forth in claim 1, wherein a vent hole is formed in the upper expansion portion to discharge the airbag gas from the interior of the cushion bag.

5. The asymmetrically expanding airbag cushion as set forth in claim 1, wherein the lower sewing line is sewn continuously or discontinuously on a lower portion of the cushion bag in such a way as to become unsewn when the lower expansion portion has fully expanded.

6. The asymmetrically expanding airbag cushion as set forth in claim 5, wherein the lower sewing line comprises a vertical sewing line which is provided on the lower portion of the cushion bag in such a way as to be sewn in a vertical direction of the cushion bag and the lower sewing line is formed in a "∩" shape.

7. The asymmetrically expanding airbag cushion as set forth in claim 1, wherein the upper sewing line is sewn continuously or discontinuously on an upper portion of the cushion bag in such a way as to become unsewn when the upper expansion portion has fully expanded.

8. The asymmetrically expanding airbag cushion as set forth in claim 7, wherein the upper sewing line comprises a horizontal sewing line which is provided on the upper portion of the cushion bag in such a way as to be sewn in a horizontal direction of the cushion bag.

* * * * *